Aug. 8, 1950      F. SCHULTE      2,518,258
ELECTRONICALLY RESPONSIVE COMPASS
Filed Nov. 24, 1948
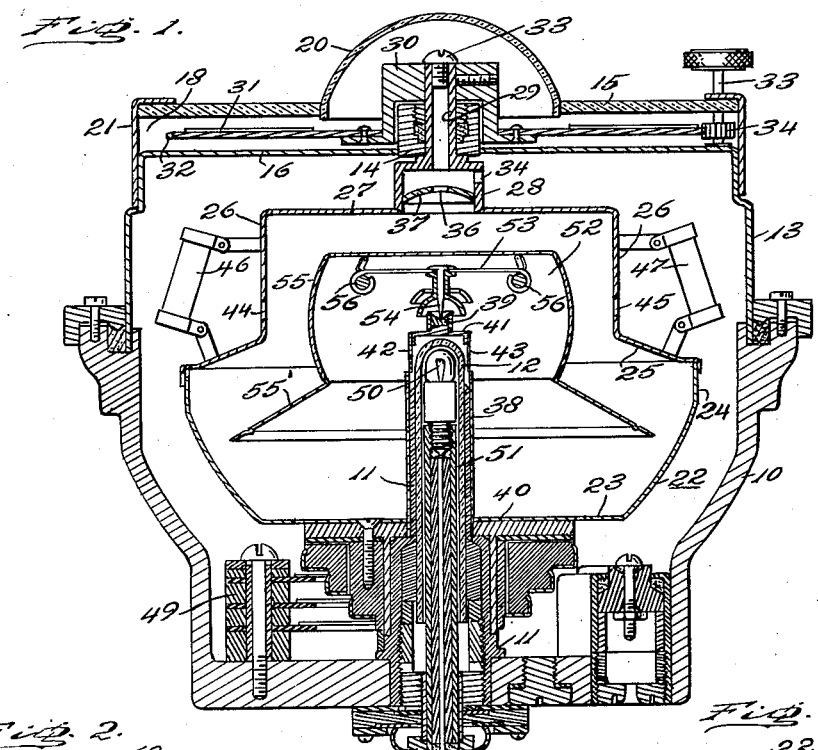
INVENTOR
Fritz Schulte
BY
Barr, Borden & Fox
ATTORNEYS.

Patented Aug. 8, 1950

2,518,258

UNITED STATES PATENT OFFICE 2,518,258

ELECTRONICALLY RESPONSIVE COMPASS

Fritz Schulte, Philadelphia, Pa., assignor to Bowes Instrument Co., Inc., Philadelphia, Pa., a corporation of Pennsylvania Application November 24, 1948, Serial No. 61,766

4 Claims. (Cl. 33—222)

This invention relates to compasses, and particularly to compasses by which deviations from a set course are electronically signalled for operative association with automatic signalling, steering, and other control devices.

It is well known, of course, that many efforts have been made in the past to secure electronically an accurate signal of ship deviation from a magnetic compass course, but so far as known each has in the last analysis been found inadequate and unsafe, because even though working fairly well in calm supporting-fluid conditions, in actual practice this is almost abstract theory. In other words, rolling, pitching, yawing, heeling, and various conditions of acceleration and deceleration all so modify the action of the device that in turbulent conditions prior art compasses are unreliable.

The fundamental required condition of a magnetic compass is a magnetic element carried by a supporting device, designated as a compass card, suspended by gravity on a single supporting point or pivot-bearing normally disposed concentrically of the card, and normally maintained in a horizontal position by gravity. To overcome as far as possible the accelerations and decelerations of the craft in which the compass is mounted relative to the card, including resultant accelerations where plural forces about divergent axes occur simultaneously, it is conventional to mount the entire compass in a gimbal suspension. Such suspensions in average conditions maintain the compass reasonably well in a substantially horizontal position of adequate utility where the helmsman is merely reading azimuthal angular motions of the compass card relative to a lubber line fixed to the ship, whereby the course of the ship is a series of huntings on each side of the desired course with the degree of hunt a function of the skill of the helmsman. However, even with such gimbal suspensions, it is found that under conditions of turbulence the compass cards move out of the horizontal in various angular directions successively. If the compass housings are not also mounted in a gimbal suspension, they respond directly to the instantaneous attitude of the craft in which they are mounted, thus moving in various angular directions successively with pitching and tossing, rolling, yawing, heeling, and other accelerations and decelerations of the craft. This tendency is frequently only minimized by mounting the housings in gimbal suspensions, as with the latter in a turbulent sea it is only occasionally that the housing of the compass is truly horizontal when the compass card is also horizontal. In other words, actual experience indicates that with the craft in turbulent fluid, even with the best of suspensions, it is rare indeed that both the compass housing and the compass card are in the horizontal positions to which gravitational forces alone would return them.

The relative oscillations between the compass card and the housing are particularly troublesome in cases where the compasses are associated with electronic systems by which signals of deviation are developed, as the circuits are not discriminatory between stimuli received as a result of azimuthal compass card and housing relative angular motion about a truly vertical axis, which is desired, and stimuli arising from relative tilting motion between the compass card and housing about some other axes which is undesired. This has caused erratic steering under moderately rough conditions, and substantially total inoperability of such compasses in really bad weather.

In my earlier patent, No. 1,929,400, a compass of better and more efficient performance than known prior art devices is disclosed, which is thoroughly operative under normal more or less easy conditions, but which is subject to the same erratic signal and control functions as other compasses under certain types of compass card relative motion incident to turbulent sea conditions. In said patent a common light source or energy transmitter is disclosed co-axial with and spaced vertically from the pivot journal of the compass card when the latter is horizontal, and photoelectric cells as receptors are mounted on the housing, and the beams from said central light source are arranged to be intercepted by an opaque portion of the card or to pass beyond a generally vertical edge formed in the compass card, to incidence upon a photo-cell, according to the instantaneous azimuthal attitude of the latter as it is relatively angularly moved in the housing, as the craft is "on" or deviates from the given course. The compass of said patent was so arranged that when the compass housing and the card are both horizontal and the craft is on the set course, both photo-electric cells were screened from the light source. By reference to that patent it will be observed that with both card and housing in horizontal dispositions, angular motion of the card on its pivot in a plane containing the edge of the compass card will not disturb the instantaneous beam relation to the photo-cell, i. e. if screened it remains screened, and if unscreened it remains unscreened to maintain the light incidence condition which maintained at the time of such angular motion. If, however, the angular relative motion of the card and housing is in a plane not substantially containing said edge, as in relative pitching, rolling, or other accelerations of the ship transverse of such plane, the angular relation of said edge will change with relation to the true vertical axis, working about the pivot of the card, and in one direction of motion may cut off or screen a previously unscreened photo-cell, or conversely may expose a previously screened photo-electric cell, with a consequent deenergization or energization of the instant photo-electric cell, with a consequent false signal, which if translated into steering control may be completely erroneous for the adherence to the set course. This defect in applicant's patented device is paralleled by other prior art devices of the same general type and therefore said devices are not universally successful under adverse conditions, even though applicant's patented device functions well in good weather.

It may be noted in passing that those prior art devices which utilize prisms, reflectors, or other complex optical systems in association with the compass assembly, are more quickly prone to erratic signalling, than the direct beam type of device shown in applicant's said patent. This is for the reason that owing to dissipation of light energy by such indirect light systems aggravated by the distances between the primary source and the photo-cells, it is necessary to use lamps of high light intensity in order to obtain clear signals, which shortens the life of the lamps. Obviously, if a lamp burns out unexpectedly while on a course dangerous results may follow the loss of steering control or the imposition of an erroneous steering control. A further disadvantage of intense light sources is the undissipated heat they develop. As such compasses having such intense light sources are frequently used in small cruisers or on the bridges of larger boats where the heat of the sun is incident directly or indirectly upon the compasses, either factor may so raise the temperatures as to destroy the operative qualities of the photo-cells used, and when both factors are operative simultaneously it has frequently caused such heat effects as to damage the sensitive coating of the photo-cells, as well as having a deteriorating effect on the damping fluid used. For several reasons, therefore, it is undesirable to require intense light sources in compasses of this type.

The primary object of this invention is to provide a compass having associated energy-responsive devices or receptors and a source or transmitter of radiant energy for actuating same which will respond to and accurately signal relative azimuthal angular movements of the card and housing substantially regardless of pitching, rolling, heeling, and other positive or negative accelerations effective on either the card or the housing, or both.

A further object of the invention is to provide a compass of the type under discussion which will not register or respond signal-wise to secondary effects of relative pitching, tossing, rolling, or other accelerations on either the compass card or housing or both periodically out of their normal horizontal parallel dispositions.

Still further objects of the invention are to provide a compass of the type under discussion; which will register and respond only to azimuthal relative movements of the compass housing and compass card; which dispenses with the use of gimbal suspensions; which is small and compact without loss of its full utility; which gives signal indications to a fraction of a degree and of such amplitude as to require a minimum of amplification for automatic steering of a vessel or craft and which uses an exciting source of radiant energy so efficiently that its filament can be operated at one-half or less of its operating capacity, which therefore provides a radiant source of extremely long life, with a corresponding decrease in emitted heat; which establishes accurate long life to the photo-cells with which it is associated; which is of extremely low initial cost and of low running expense; which successfully immerses all of the operating elements in the same damping fluid as is used for the compass card, including the slip rings and brush assemblies used for the photo-cell circuit; which protects all of the agencies involved from adverse and corrosive actions of ambient air; which reduces stray light about the compass with a consequent raising of the visual acuity of the pilot during night running; and other objects and advantages will become more apparent as the description proceeds.

In carrying out the invention in a purely illustrative embodiment, an angularly adjustable compass housing is provided, adjustable about a vertical axis, receptors such as photo-electric cells are mounted on the housing, a radiant energy transmitter such as a light source is mounted to project rays toward the photo-electric cell from a point lower vertically than the photo-electric cells, a compass card is mounted for universal motion on a pivot disposed in a horizontal plane spaced vertically from the point of projection of the light rays, said card having a peripherally incomplete substantially opaque hemispherical body generated substantially about said pivot, said body in its incompleteness being cut away peripherally to form a pair of spaced edges each generally parallel to the axis of the card, said light source and said photo-electric cell forming a path for projected radiant energy, which path intersects the horizontal plane containing the pivotal axis of the card substantially at the card body, so that rocking the compass card on an axis lying in said horizontal plane containing the pivot and passing by or substantially adjacent to an edge causes the rocking of such edge about the intersection of the light beam on the card as an axis, so that such rocking neither exposes a concealed light beam for transition to said photo-cell nor conceals nor intercepts an open light beam incident upon the light beam incident upon the aligned photo-electric cell.

In the accompanying drawings:

Fig. 1 represents a vertical diametrical section through a compass according to one embodiment of the invention, showing the important but illustrative structural features thereof.

Fig. 2 represents a diagrammatic horizontal section through certain of the operating portions of the card, housing and light beams, with the card and housing disposed in the one relative position at which both light beams are intercepted so that both photo-cells are deenergized, when the card and housing are so arranged relatively as to accord with the "course" setting.

Fig. 3 represents a similar diagrammatic horizontal section through the assembly of Fig. 2, in which a deviation from the "course" has occurred, and showing the incidence of one light beam on its photo-cell while the other beam remains intercepted by the card, to indicate and signal the fact of the deviation.

Fig. 4 represents a diagrammatic vertical section of the card, housing and light beam assembly of Fig. 2, showing the angular relation of the light beams to the horizontal plane containing the pivot of the card and with the light beams both intercepted by the card to preclude energization of the respective photo-cells, showing in dotted lines the compass card tipped on its pivot about an axis extending diametrically of the card through the pivot, as a result of a relative force along the arrow 4 of Fig. 2 transverse of such axis.

Fig. 5 represents a diagrammatic vertical section of the device as positioned in Fig. 2, with the section taken at right angles to the section line of Fig. 4, showing the light source projecting the upwardly inclined beam toward the photo-cell schematically indicated in dotted lines and schematically showing the area of incidence of the inclined beam on the opaque card body adjacent to its edge as a small circle generally symmetrical of the intersection of the light beam with a projected axis on a diameter lying in a horizontal plane passing through the pivot and disposed in the same vertical plane as the light beam, and in dotted lines shown as rocked by force along the arrow 5 of Fig. 2, to show the continuing incidence of the light beam on and its interception by the opaque area of the card during such forced relative angularity of the compass card. The axis of "rock" in the horizontal plane and the light beam path intersect the opaque body at substantially the same point beside said edge.

Fig. 6 represents a diagrammatic vertical section of the card housing and light beam assembly of Fig. 3, showing the angular relation of the light beams to the horizontal plane containing the pivot of the card, with one edge thereof disposed to continue the interception of one light beam, whereas the other edge thereof has been moved to withdraw from interception of the other beam which is shown incident upon its associated photo-cell to energize same, and showing in dotted lines the compass card tipped on its pivot about an axis extending diametrically of the card through the pivot as a result of relative force along the arrow 6 of Fig. 3, to show the continued incidence of the last mentioned beam on its photo-cell despite such angular motion of the card.

Fig. 7 represents a diagrammatic vertical section of the device as positioned in Fig. 3, with the section taken at substantially right angles to the section ilne of Fig. 6, showing the light source projecting the upwardly inclined energy in a complete unintercepted beam schematically indicated in dotted lines, and schematically showing the beam in the general projected area of the card beside the edge of the opaque portion thereof as a small circle substantially symmetrical of the intersection of the light beam and the projected diameter of the card lying in a horizontal plane passing through the pivot of the card in a vertical plane containing the light beam, and in dotted lines shown as rocked by relative force along the arrow 7 of Fig. 3, to show the continued incidence of the beam on the photo-cell during such forced angularity of the card. The axis of "rock" in the horizontal plane and the light beam path meet in an intersection beside the edge in the light transmitting portion of the card.

Referring to Fig. 1, a binnacle frame 10 is shown within which a central vertical hollow post 11 is mounted in fluid tight relation to the binnacle frame. The hollow post preferably terminates at its upper end in a hollow glass or like energy-transmitting enclosure 12, and the post 11 and glass terminus are rigidly fixed in the binnacle. The binnacle is substantially closed at its upper end by the sheet metal dome 13, in fluid tight relation to the lower portions of the binnacle. The metal dome includes the upper horizontal surface 16 in which packing gland unit 14 is mounted, the axis of which is aligned with the post 11. A transparent window or enclosure 15 is mounted on the dome in parallel spaced relation to the upper surface 16 of the dome to form a compass setting disc space 18. Preferably a portion of the window formed as a hemisphere of plastic or glass, in the center of the window is made removable, as indicated at 20. The glass window 15 is held to the dome by the bezel 21. The housing of the compass 22 is formed of a lower sheet 23, an outwardly and upwardly flaring enclosure portion 24, an annular flange potrion extending inwardly and upwardly from the flare 24 as at 25 leading into a generally cylindrical portion 26 closed by the upper end 27 having the axially concentric upward cylindrical extension 28 leading to a reduced hollow shank end portion 29 passing through the gland 14. At the extreme upper end the extension 29 is secured to a thimble 30 which carries the compass ring plate 31 having peripheral teeth 32. A manually operated shaft 33 is journalled in the bezel and carries a pinion gear 34 in mesh with the teeth to turn the compass ring with reference to the binnacle in setting a course.

A suitable lubber line (not shown) is formed in or under the window 15 as a datum line for setting the course. The open tube 29 is normally closed by a suitable plug as by the screw 33, removable for the purpose of adding damping fluid, which passes down the tube into the cylinder 28, and through suitable apertures in the cylinder, such as at 34 in the side of the cylinder, and 36 in the insert 37 closing the cylinder below the aperture 34. The conventional air bubble is established and maintained by this filling and sealing arrangement. The upper end of the assembly is formed as described in order to establish a high liquid level of insulating damping fluid for the compass card to be described.

The compass housing 22 is provided axially with the rigid hollow stem 38 extending perpendicularly from the upper surface of the lower horizontal wall 23 and so formed as to seat over and enclose the inner stationary light supporting post 11, and to have rotation relative thereto with the movements of the compass housing, as its angular position shifts with rotations of the compass ring under the manual action of the operator through control shaft 33. On the lower surface of the horizontal plate 23 of the compass housing a journal is mounted as at 40 for rotation on the post 11. The compass housing and post 38 are thus journalled for controlled angular motion about the axis of the post 11. The upper end of the hollow stem 38 has a transverse horizontal closure cap 41 in the center of which a pivot jewel 39 is mounted extending vertically upward. Preferably the hollow stem just below the cap 41 is provided with diametrically spaced windows or gates 42 and 43, forming beam-defining openings in the post, if such concentrated or sharply defined beams should be preferred. As will be pointed out, such isolated narrow beam formation is preferred as it avoids false or indefinite indications from reflected light, but is in no way an essential. The proportions of windows 42 and 43 may vary within wide limits, and may be of any number, whether one, two, or more. In a diametrical vertical plane containing the vertical central axes of the windows 42 and 43, the cylindrical portion 26 of the compass housing 22 is provided with windows 44 and 45 in a horizontal plane spaced vertically from the horizontal plane containing the windows 42 and 43. The light responsive elements such as photocells 46 and 47 are mounted rigidly on the compass housing 22 with their sensitive areas respectively with the paths established by the respective pairs of windows, i. e. 42 and 44 for light responsive agency 46, and windows 43 and 45 for light responsive agency 47. It will be seen that the paths thus defined are each angularly divergent from the horizontal, and in the illustrative case incline upwardly from the center at the light center (to be described) within the post 11. It will be observed also that the intersection of the light beam paths in a downwardly directed apex within the post 11, is in a horizontal plane vertically spaced from the jewel bearing surface 39. A light source 50 is carried on a column 51 and mounted removably within the post 11, and the center of radiation of the light source 50 is placed at the inner apex of the light paths in a horizontal plane spaced from the horizontal plane of the pivot bearing 39, but so that light energy on said paths is projected upwardly relative to said pivot bearing plane. Slip ring devices 49 similar to those in said patent are provided for energizing the photocells.

A magnetic element, with or without visible indicia or graduation, designated herein as a compass card 52 is provided comprising a top spider 53 carrying the central pivot pin 54 centered and supported on the jewel bearing 39, and a generally spherical card-like element 55 is mounted on the spider having an arcuate surface generated about the point of the pivot pin 54, and preferably carries at its lower edge a flaring skirt 55' to facilitate damping of the card movements in the damping fluid. The spider carries preferably a pair of parallel spaced permanent magnets 56—56, as is common with such cards for maintaining the angular position of the card in space.

In order to form light intercepting and transmitting portions of the compass card, a portion of the peripheral wall of the card is removed to form, preferably, two substantially parallel axially extending substantially radially cut edges 57 and 58 joined in an area of opaque material 60, on one side, and spaced by an area of light transmission 61 on the other side. While a semi-spherical compass card is preferred for its efficiency, it will be understood that if desired other shapes may be used, without departing from the spirit of the invention. For instance, the card in profile may be conical, cylindrical, reversely spherical, or the like, but the efficiency of such card formations will be less than that which attaches to the preferred semi-spherical card, for obvious reasons. The only essential of the card element shape or profile is that it have axial elongation between axially spaced limiting means, which may be mere edges. While it will be clear that many variations of the compass card and light path assembly can be made, the functions of the assembly will be illustrated by recourse to the presently preferred embodiment. With the light paths from the source of radiation through the windows to the photo-cells, lying in a common vertical plane diametrical of the assembly, and therefore spaced approximately 180°, the opaque portion of the compass card terminating in the spaced edges thereof will be slightly greater than 180° so that when the compass card and the compass housing are mutually so disposed that the craft is on the "course;" the opaque portion of the card intercepts light on both paths so that both light-responsive devices are relatively de-energized. This is the condition indicated diagrammatically in Figs. 2, 3 and 4. In this condition there is no positive signal developed, and the steering device to be associated with the compass will hold its instantaneous course.

Although the compass card is mounted for accurate centering and attainment of a truly horizontal position under the action of gravitation, for which it is designed, and for maintenance of an azimuthal angular setting in accordance with the terrestrial magnetic field, it is recognized that under various forces acting upon the pivotal support there are individual forces or resultant forces tending to move the compass card out of its horizontal disposition, such forces as are represented by positive and negative accelerations, (accelerations and decelerations) pitching, rolling, and heeling of the craft in which the compass is mounted. In the prior art experiences with compasses of this general type it had been contemplated that such erratic compass card relative movements would either be so damped as to be ineffectual or would be so transitory as to have little effect on the average control or signal development. With the card so disposed as to intercept the light beam other than as herein disclosed, and with the edge of the opaque portion generally parallel to the vertical axis containing the pivot pin and pivot, rolls or other relative motions causing the compass card to tilt on its pivot so that pin 54 moves in a plane substantially coincident with said edge, would be ineffectual to change the interception of the light beam so that such a roll, for instance, would not cause the development of a signal when the azimuthal attitude of the card would not necessitate a signal. However, such isolated single plane force is rare. When the pin 54 moves in a plane which is not substantially coincident with said edge, the edge is effectively rocked, with the portion above the pivot point moving in one direction, and the portion below the pivot point moving in the other direction. While this latter oscillation is ineffectual to change the signals from the system during temporary wide misalignments of the card and housing, as during a change of course setting, it is critical when an edge of the opaque portion is in line with or even relatively adjacent to the intersection of such diameter with the card. It will be seen that cocking of the edge in response to such rocking of the card may move the opaque portion from a non-intercepting position relative to the light beam into interception thereof to develop a signal the reverse of what is proper, or conversely may move the opaque portion from proper interception into non-intercepting relation, with a consequent development of a signal the reverse of what is proper. Therefore in turbulent seas the control of the steering or the creation of signals as to the course and deviations therefrom have been erratic and erroneous and disastrous results have accrued. With the invention herein, however, such erratic behavior is eliminated and even in turbulent seas continued perfect signal developments and steering control are effected.

This important advance is secured herein by insuring that the light beam intersects the horizontal plane containing the axis of the card in an acute angle having its apex in the hemispherical portion of the card, so that when the light beam in a vertical plane containing the pivotal axis of the card is substantially coincident with the edge of the card so that the cocking axis is on a diameter lying in or substantially close to the plane of the light beam, the cocking axis point of intersection with the card is coincident substantially with the light beam. The edge of the card in responding to cocking force in effect turns substantially about the light beam as an axis, in the peripheral extent of the hemispherical portion of the card, so that if in the instantaneous azimuthal setting of the card and housing the light beam is intercepted so as not to fall on its photo-cell, rocking of the card and cocking of the edge adjacent to the instant light beam will be ineffective to uncover the beam as a function of rocking. Conversely, if the edge has been relatively withdrawn from its interception of the instant light beam, cocking of the edge with rocking of the card will also be ineffectual to cause relative card movement to interpose intercepting opaque portions of the card in the path of the light beam.

It will be understood that within the broad concept of the invention it is not material whether the light beams and coordinated light responsive agencies are comprised in a single assembly, or whether there are two or even more of such beams and photo-cells. It is also immaterial whether the central source of light is an actual light source or prisms or reflectors for projecting light energy in the desired directions. Similarly, it is immaterial whether the radiant energy is visible or invisible radiant energy, and whether the light receptors are photo-electric cells or merely thermocouples or the like responsive to heat energy. It will be observed that it is also immaterial in the broadest aspects of the invention whether the signals or steering or other controls are derived as positive or negative responses to the light energy. In other words, a positive signal is derived from energization of the photo-cell or its equivalent, a negative signal is derived from de-energization of the photo-cell or its equivalent. Finally, it will be recognized that within the broad aspects of the invention, a partial energization of the receptor may constitute the datum energization with positive and negative responses with variations of the incident illumination effective on the receptor. In this case the edge position will be such as to substantially evenly cut the light beam as the proper "on course" setting and obviously with azimuthal relative swings of the card and housing will increase or decrease the radiation incident on the receptor with consequent positive or negative signals.

It will be clear that the invention is applicable to compass for use in any desired sorts of craft, whether surface, sub-surface or aircraft, and such modifications of the compass as may be necessary, if any, to adapt them to the particular crafts, will be made, without departing from the spirit of the invention.

The essence of the invention is the provision of structure by which any rocking of the card involving the tilting of the edge about a horizontal pivot axis is also substantially a tilting about the axis of the light beam, and therefore is substantially incapable of changing the instantaneous condition of incidence of said beam on the light flux responsive element.

In other words, the only critical rocking is when the edge is on one side or the other of the beam, and the rocking occurs about the beam. Within this broad concept it will be apparent that whether the axis for the card is above or below the light source will make no difference, as the same relative inclination attaches, varying only in whether the inclination of the beam is upward or downward. Similarly, it makes no particular difference whether the light source is on the central axis or whether by prisms or reflectors or plural sources the light projection is toward the axis and the photo-cells are on the axis, although this reversal is not presently preferred. Finally, it will be apparent that the presence or absence of gimbals makes no particular difference in the utilization of the invention and these may be added or not as may be desired. All such changes and modifications as have been mentioned herein and others that may occur to those skilled in the art are to be construed as within the scope of the invention, unless otherwise specifically excluded in the appended claims.

Having thus described my invention, I claim:

1. In a compass, a support having a support axis, a magnetic compass element having an element axis for relative azimuthal rotation and comprising a wall portion substantially generally coaxial with said element axis, means defining element axially spaced limits between which said wall portion extends, complemental means on the support and element forming a universal pivotal point for said element relative to said support which is substantially intersected by both of said axes, means defining an edge on said wall portion substantially coincident in part with an axial plane substantially radial of said element axis intersecting said wall portion, said wall portion and edge being intersected between said limits by a plane passing through said point and normal to said support axis, light flux members comprising respectively a light flux projector and a light flux responsive receptor, means mounting the respective members on the support on respectively opposite sides of the wall portion of the element to define a flux path between the members having a linear axis intersecting said wall portion substantially at the intersection thereof by said normal plane, whereby the effective incidence of light flux on said receptor is controlled by said edge as a function only of the relative azimuthal motion of the element and support.

2. A magnetic compass comprising a support having a support axis, a magnetic compass element having an element axis and a generally arcuate peripheral portion, complemental means on the element and support comprising a universal point support for the element at the intersection or coincidence of the support and element axes, said element having one condition of stable equilibrium relative to the support at which the said support and element axes are coincident and perpendicular to a normal plane passing through said point, said peripheral portion comprising an elongation axially of the element axis which is intersected by and extends axially of the element axis thereof in both directions beyond said normal plane in said one condition of stable equilibrium, light flux members, comprising respectively a light-flux projector and a light-flux responsive receiver, means mounting said members on the support respectively on opposite sides of said arcuate peripheral portion to define a flux path intersecting said portion substantially at the intersection thereof by said normal plane, said arcuate portion having an edge substantially normal to and intersected by said normal plane and extending in both directions therefrom in said one condition of stable equilibrium, said element being rotatable relatively in azimuth on said point support to displace said edge relative to said flux path for predeterminedly controlling the incidence of light flux on said receiver element while substantially precluding accidental control of such incidence due to changes from said one condition of stable equilibrium.

3. In a compass, a support having a support axis, a magnetic compass element having an element axis for relative azimuthal rotation and comprising a wall portion substantially generally coaxial with said element axis, means defining element axially spaced limits between which said wall portion extends, complemental means on the support and element forming a universal pivotal point for said element relative to said support which is substantially intersected by both of said axes, means defining an edge on said wall portion substantially coincident in part with an axial plane substantially radial of said element axis intersecting said wall portion, said wall portion and edge being intersected between said limits by a plane passing through said point and normal to said support axis, light flux members comprising respectively a light flux projector and a light flux responsive receptor, means mounting the respective members on the support on respectively opposite sides of the wall portion of the element at positions spaced axially of said support axis on respectively opposite sides of said normal plane to define a flux path between the members having a linear axis passing through said normal plane substantially at the intersection thereof with said wall portion.

4. In a compass, a support having a support axis, a magnetic compass element having an element axis for relative azimuthal rotation and comprising a wall portion substantially generally coaxial with said element axis, means defining element axially spaced limits between which said wall portion extends, complemental means on the support and element forming a universal pivotal point for said element relative to said support which is substantially intersected by both of said axes, said wall portion comprising a semisphere substantially generated about said point, means defining an edge on said wall portion substantially coincident in part with an axial plane substantially radial of said element axis intersecting said wall portion, said wall portion and edge being intersected between said limits by a plane passing through said point and normal to said support axis, light flux members comprising respectively a light flux projector and a light flux responsive receptor, means mounting the respective members on the support on respectively opposite sides of the wall portion of the element to define a flux path between the members having a linear axis intersecting said wall portion substantially at the intersection thereof by said normal plane, whereby the effective incidence of light flux on said receptor is controlled by said edge as a function only of the relative azimuthal motion of the element and support.

FRITZ SCHULTE.

REFERENCES CITED

The following references are of record in the file of this patent:

UNITED STATES PATENTS

| Number | Name | Date |
|---|---|---|
| 1,834,399 | Helmer et al. | Dec. 1, 1931 |
| 1,929,400 | Schulte | Oct. 3, 1933 |
| 2,204,553 | Smola | June 18, 1940 |

FOREIGN PATENTS

| Number | Country | Date |
|---|---|---|
| 796,129 | France | Jan. 17, 1936 |